Jan. 29, 1963  J. E. LINDBERG, JR  3,075,361
METHOD AND APPARATUS FOR TRANSFERRING HEAT
Filed Nov. 8, 1957                                    2 Sheets-Sheet 1
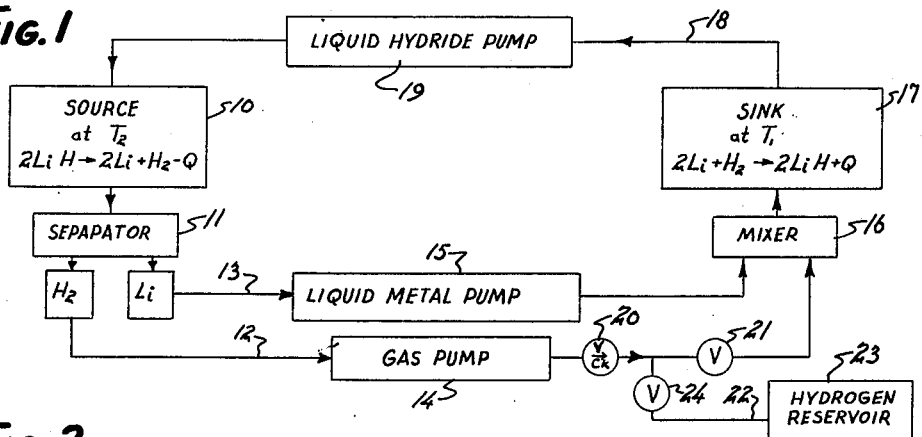
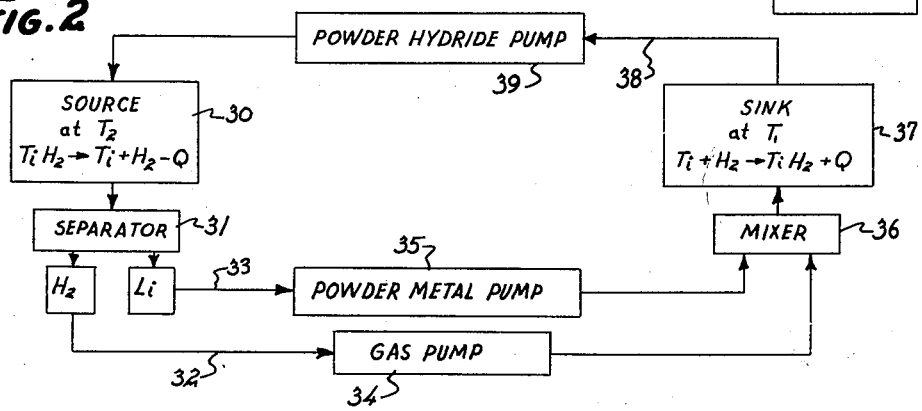
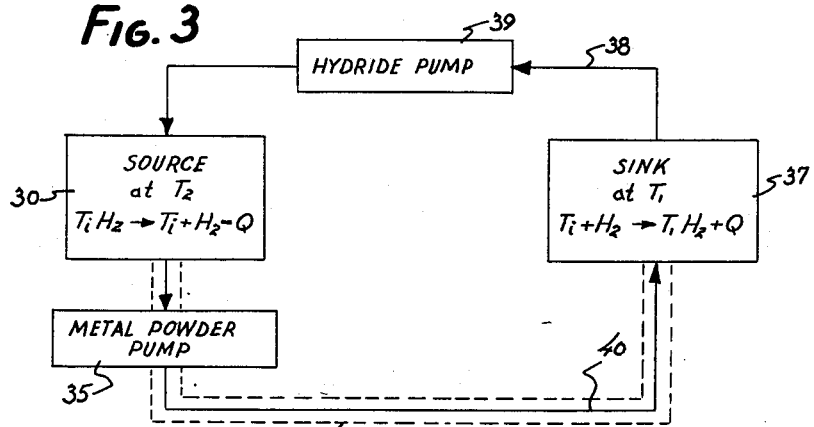
INVENTOR.
JOHN E. LINDBERG
BY
ATTORNEY Jan. 29, 1963   J. E. LINDBERG, JR   3,075,361
METHOD AND APPARATUS FOR TRANSFERRING HEAT
Filed Nov. 8, 1957   2 Sheets-Sheet 2
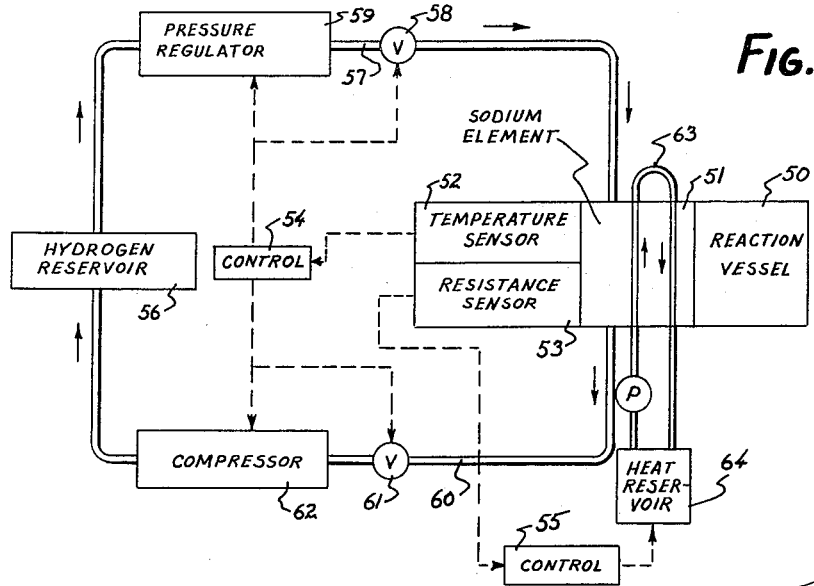
FIG. 4
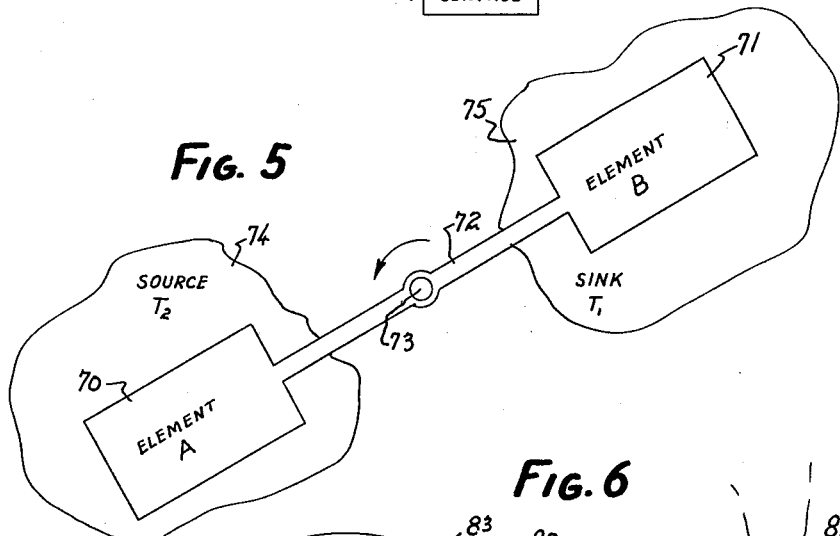
FIG. 5
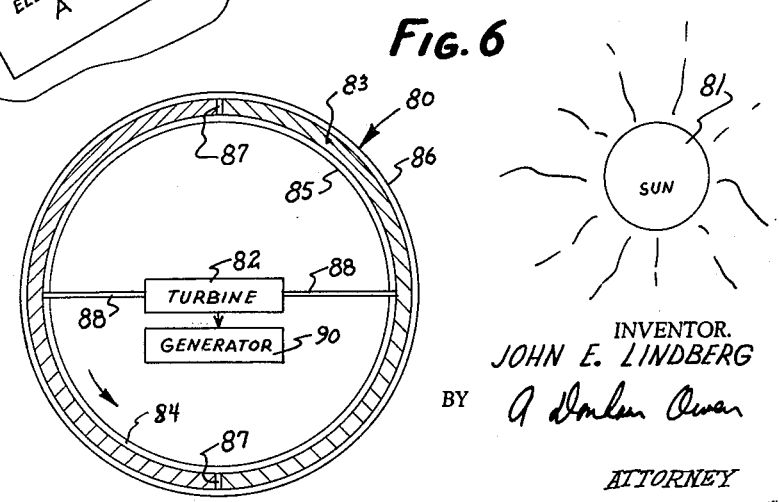
FIG. 6
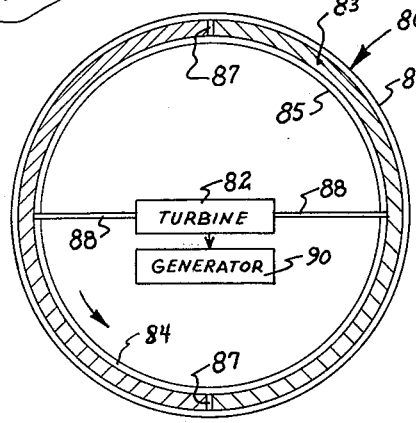
INVENTOR.
JOHN E. LINDBERG
BY
ATTORNEY

United States Patent Office 3,075,361
Patented Jan. 29, 1963

3,075,361
METHOD AND APPARATUS FOR
TRANSFERRING HEAT
John E. Lindberg, Jr., Lafayette, Calif.
(1024 Addrienne Drive, Alamo, Calif.)
Filed Nov. 8, 1957, Ser. No. 695,357
18 Claims. (Cl. 62—4)

This invention relates to improvements in method and apparatus for transferring heat between a heat source and a heat sink; in its various embodiments as described herein, it will find broad application in the chemical, petroleum and metal-processing industries, as well as many others.

Conventional heat transfer methods depend almost solely on the product of the specific heat and the quantity of a heat transfer medium that is cycled between the source and the sink. For example, when water is used to cool an engine, the amount of heat removed from the engine by the water is the product of the difference in temperature between the engine and the air, the mass of water circulated, and the specific heat of water. While this method has its advantages and is satisfactory for many purposes, it also has many disadvantages, and in some circumstances they outweigh the advantages. Thus, some temperature ranges are too hot for use of liquid water, and even steam becomes very difficult to handle. In fact, it is well known that some atomic energy installations use liquid sodium in spite of its relatively low specific heat (about .294). The liquid sodium, considered abstractly, is less than one-third as efficient as water, but water cannot be used in the liquid state above 100° C., and the liquid sodium is preferred to most other materials because its specific heat is high in comparision with most other metals.

When practicing the conventional methods of heat transfer, it is necessary to move the entire medium from the source to the sink. A relatively low amount of heat is transferred per quantity of medium moved. Moreover, large-capacity pumps have to be used if large amounts of heat are to be transferred.

The present invention differs from the prior art by placing substantial reliance on the heat energy associated with certain types of thermodynamic transformations, particularly those accompanying chemical reaction and physical solution. In some transformations, the energy change is orders to magnitude larger than that involved in heating conventional heat exchanger media. When considered in terms of the heat energy transferred per unit mass of medium moved, the present invention achieves rather astounding results.

Two requirements of my invention are: (1) In the thermodynamic transformation, heat must be absorbed from the source and released to the sink; (2) in a cyclic system, the transformation must be reversible between the temperature of the source and the temperature of the sink.

Many chemical compounds and solutions do not produce enough heat during their formation or dissolution to be of practical use in my invention. Moreover, many transformations are not reversible within practical ranges of temperature. The present specification therefore considers certain transformations that are reversible within practical temperature ranges and that absorb much heat per unit weight from the source and release it to the sink.

The method of this invention makes it possible to absorb a large proportion, in some cases the major portion, of the heat energy produced at the source in an endothermic transformation and to liberate that heat at the sink in an exothermic transformation. For example, hydrogen or oxygen may be liberated from certain metals at the source and recombined at the sink. In some instances, if desired, the temperature at the source may be the same as, or even lower than, the temperature at the sink; this invention enables the transfer of large quantities of heat in spite of a small temperature difference, and even in opposition to the temperature difference. When methods which rely upon specific heat alone are used, heat transfer between a source and a sink with but a small temperature differential is very inefficient; such methods cannot be used at all when the source is at a temperature lower than or equal to that of the sink. Even with the source temperature above that of sink, such methods allow little heat to be carried per unit weight of medium. But in the present invention, a highly endothermic transformation at the heat source can be used to transfer a rather vast amount of heat to the sink, even though the source and the sink are at the same temperature, or even if the source is at a lower temperature than the sink.

In this invention, the amount of heat $Q_1$ which may be transferred by the heat-exchange medium of mass $M$ may be expressed as:

$$Q_1 = M[Q_2 + S_c(T_{source} - T_{sink})]$$

Where $Q_2$ is the heat of formation of the compound, $S_c$ is the specific heat content of the compound, $M$ is its mass, and $T_{source}$ and $T_{sink}$ are the respective temperatures of the source and the sink. For heat to be transferred from the source to the sink, $Q_1$ must be a positive quantity, which in turn implies that $Q_2$ must be greater than $S_c(T_{source} - T_{sink})$ if $T_{sink} > T_{source}$. This requirement for heat transfer from source to sink can usually be met by a proper choice of the heat-exchange medium according to the present invention, for while $S_c$ is a relatively small quantity, $Q_2$ is quite large for many materials employed in this invention, as is shown in several examples on following pages. In the conventional style of heat transfer, however, the term $Q_2$ is absent in the above expression and such methods would fail if $T_{sink} \geq T_{source}$, since in that event heat would be carried from the "sink" to the "source." Since $Q_2$ is large for many reactions, the present invention will operate at superior efficiency over very wide temperature ranges, including the case of the source temperature being considerably lower than that of the sink.

Another important advantage of the invention is that often only a part, frequently a small part, of the medium need be transferred between the source and the sink. Instead of having to pump the entire mass, only a small fraction is pumped. For example, in certain applications where a metallic hydride is used, only the hydrogen need be transferred. In certain particular reactions explained below, a tremendous amount of heat energy can be transferred per unit mass of the hydrogen pumped.

There are other advantages of the invention. For example, the time-temperature relationship at the sink can be controlled independently of the time-temperature input at the source by controlling the rate of the recombination of a gas and a metal at the sink.

The present invention also distinguishes from the prior art in being practical at very high temperatures. Heat can be transferred at temperatures not heretofore feasible, and this fact demonstrates the utility of this invention in chemical, petroleum, metal-processing, and atomic energy applications, among others.

Other objects and advantages of the invention will appear from the following description of several preferred embodiments thereof.

In the drawings:
FIG. 1 is a schematic diagram of a heat-transfer system embodying the invention and using lithium hydride.

FIG. 2 is a similar schematic diagram of a modified heat-transfer system embodying the invention and using a powdered metal and a gas.

FIG. 3 is a schematic diagram similar to FIG. 2 but further simplified.

FIG. 4 is a schematic diagram of a modified form of heat-transfer system embodying the invention in which there is a control by pressure variation.

FIG. 5 is a schematic view of a type of another modified heat-exchange system embodying the invention and primarily a moving envelope system that oscillates or rotates between having one side at the source and one at the sink and a reversal thereof.

FIG. 6 is a diagrammatic view of a spherical earth satellite, shown in section, with the position of the sun indicated.

Some particular thermodynamic transformations embodying the invention have been found to be exceptionally useful, and they will serve as examples illustrating the principles of this invention. These transformations concern the interaction between certain gases and certain metals.

Hydrogen combines with some metals to produce actual stoichiometric hydrides. With some other metals it forms what are often called hydrides but are not stoichiometric compounds; actually the hydrogen is physically dissolved in these metals. Except for careful chemical investigation, it would be difficult to tell the difference between the solutions and the true reactions; in fact, only recently has there been any differentiation. In both cases considerable heat is produced during combination (exothermic), and in both cases heat is required for dissolution (endothermic). Both produce "hydrides," and the principal difference is only that in one case reaction is stoichiometric and in the other it is not. Both reactions are reversible; both release heat as hydrogen is taken into the metal due to temperature decrease or pressure increase or both, and both absorb heat when the hydrogen is removed from the metal due to decrease in pressure or increase in hydride temperature or both.

The stoichiometric reaction is between hydrogen and the alkali and alkaline earth metals. Specifically, hydrogen reacts with lithium, sodium, potassium, rubidium, cesium, calcium, radium, strontium, francium and barium, in stoichiometric proportions to form hydrides. The heats of formation and dissolution of all these hydrides is quite large, of the order of 10,000 calories per mole. Moreover, the ranges of temperatures between formation and dissolution are quite practical for use in many applications of heat exchange. Some specific examples are given below, and Tables I and II are furnished to show some of the heat properties of some of these compounds.

TABLE I.—HEAT PROPERTIES OF SOME ALKALINE HYDRIDES

| Hydride | Heat of Formation, Gram Calories per Gram of Compound Q | Heat Content of Metal per Gram of Hydride, Gram Calories per Degree Centigrade $S_m$ | Heat Content of Gas per Gram of Hydride, Gram Calories per Degree Centigrade $S_g$ | Heat Content of Compound (Hydride), Gram Calories per Degree Centigrade $S_c$ |
|---|---|---|---|---|
| LiH | 2,705 | 0.741 | 0.450 | 1.191 |
| NaH | 548 | 0.282 | 0.149 | 0.431 |
| KH | 353 | 0.174 | 0.089 | 0.263 |

Note: In this and in the following tables, the following relations hold true—

(1) $$S_m = C_m \frac{M_m}{M_c}$$

(2) $$S_g = C_p \frac{M_g}{M_c}$$

(3) $$S_c = S_m + S_g$$

Where $M_g$ is the formula mass of the gas, $M_m$ is the formula mass of the metal, $M_c$ is the formula mass of the hydride, $C_m$ is the specific heat of the metal (gram calories per gram per degree centigrade), and $C_p$ is the specific heat of the gas at constant pressure. (For $H_2$ this is 3.50 over the 0–1000° C. range.)

TABLE II.—HEAT PROPERTIES OF CERTAIN ALKALINE EARTH HYDRIDES

[The units in the table headings are the same as in Table I]

| Hydride | Heat of Formation Q | Heat Content of Metal $S_m$ | Heat Content of Gas $S_g$ | Heat Content of Hydride $S_c$ |
|---|---|---|---|---|
| $CaH_2$ | 1,161 | 0.149 | 0.170 | 0.319 |
| $SrH_2$ | 469 | 0.054 | 0.080 | 0.134 |
| $BaH_2$ | 293 | 0.067 | 0.051 | 0.118 |

Hydrogen interacts with two other groups of metals, one of these, known as the "group A metals," consists of copper, silver, molybdenum, tungsten, iron, cobalt, nickel, aluminum, platinum, manganese, technetium, rhenium, osmium, iridium, ruthenium, and rhodium; chromium is a member of this group at temperatures greater than about 300° C. The action appears to be a type of solubility, and the solubility increases with increasing temperature. However, a relatively small magnitude of heat is absorbed as the temperature is raised and hydrogen goes into solution in the metal. This heat is liberated when the temperature or pressure is decreased to cause removal of the gas from the metal.

The solubility of hydrogen in the group A metals varies (at least over a wide range of temperatures and pressures) according to the equation:

$$s = \frac{c_1 P^{1/2} e^{-(Q/1.987T)}}{dT^{1/4}}$$

in which $s$ is the solubility of molecular hydrogen in the metal, $c_1$ is a constant of proportionality, $P$ is the pressure, $e$ is the base of natural logarithms, $Q$ is the heat absorbed in calories per mole of $H_2$, $d$ is the density of the metal, and $T$ is the temperature, in degrees Kelvin.

More useful is the solution of hydrogen in what are known as the "group B metals," the class consisting of scandium, titanium, vanadium, ytterbium, zirconium, niobium, hafnium, tantalum, the rare earth metals (atomic numbers 57 through 71), and the actinide metals (atomic numbers 89 through 103); palladium is a member of this group at temperatures greater than about 300° C. This solution is often termed a "hydride," though it is not a stoichiometric compound. The solubility of hydrogen in group B metals varies (at least over a wide range of temperatures and pressures) according to the equation:

$$\frac{s}{s_0 - s} = \frac{c_2 P^{1/2} e^{+Q/1.987T}}{T^{7/4}}$$

where $s_0$ is the solubility at saturation at room temperature, $c_2$ is another constant of proportionality, and $s$, $P$, $e$, $Q$, and $T$ have the same meaning as in the preceding equation.

Some of the heat properties of some of these hydrides are shown in Table III.

TABLE III.—HEAT PROPERTIES OF CERTAIN GROUP B HYDRIDES

[The units in the table headings are the same as in Table I]

| Hydride | Heat of Formation Q | Heat Content of Metal $S_m$ | Heat Content of Gas $S_g$ | Heat Content of Hydride $S_c$ |
|---|---|---|---|---|
| $TiH_{1.75}$ | 634 | 0.120 | 0.126 | 0.246 |
| $ZrH_{1.92}$ | 417 | 0.065 | 0.074 | 0.139 |
| $PdH_{0.59}$ | 23.7 | 0.058 | 0.021 | 0.079 |

Oxygen also combines in an analogous manner with several metals, particularly silver, mercury and palladium, in stoichiometric relation, in reactions that are reversible within ranges of temperatures making their use in heat transfer practicable. The temperature ranges are different from those of the hydrides; and this difference makes the reactions of great interest. Large heats of formation, in the order of scores or hundreds of calories per gram of compound, result, as Table IV indicates.

TABLE IV.—HEAT PROPERTIES OF CERTAIN OXIDES

[The units in the table heading are the same as in Table I]

| Oxide | Heat of Formation Q | Heat Content of Metal $S_m$ | Heat Content of Gas $S_g$ | Heat Content of Oxide $S_c$ |
|---|---|---|---|---|
| PdO | 171.5 | 0.051 | 0.015 | 0.066 |
| $Ag_2O$ | 31.3 | 0.052 | 0.028 | 0.080 |

The examples which follow disclose specific embodiments of the invention using some of the oxides and hydrides discussed above.

*Example 1.—Lithium Hydride as a Heat Exchanger*

Lithium hydride is unique among hydrides in that both the hydride and the metal are normally liquid at both the temperature of formation (in-gassing) and the temperature of dissolution (out-gassing).

Referring to FIG. 1, liquid lithium hydride is decomposed at a heat source 10, which is at a temperature $T_2$ at or above the critical temperature of dissolution. The decomposition yields gaseous hydrogen and liquid lithium, and it is endothermic, absorbing from the source 2705 gram-calories per gram of hydride. Preferably, the gaseous and liquid phases are separated by a suitable separator 11 and are pumped by individual conduits 12, 13 and individual pumps 14, 15 to a mixer 16, where they are blended in the desired proportions and passed into a heat sink 17, which is at a temperature $T_1$, below the temperature of dissolution.

The lithium and hydrogen are thus cooled by the sink 17 to a temperature level where they can recombine. They then release to the sink 17, in an exothermic reaction, the 2705 gram-calories per gram they absorbed at the source 10. The reconstituted lithium hydride is returned to the source 10 by a conduit 18, preferably by a liquid metal pump 19, and the cycle is repeated indefinitely. The amount of heat transferred by the alternation of the endothermic and exothermic reactions is vastly greater than that transferred by the specific heats of the elements.

The metal pumps 15 and 19 used for pumping the liquid lithium hydride and the liquid lithium may be conventional induction pumps similar to those now in use for circulating liquid sodium in nuclear reactors. The hydrogen pump 14 may be classified as a compressor or as a vacuum pump, depending upon the chosen inlet and outlet pressures. Although the pressures at the source 10 and at the sink 17 may vary over a rather wide range, as indicated in the calculation of dissociation pressure below, in a typical application of the system of FIG. 1 the source 10 and sink 17 may be operated at the same pressure, allowing the elimination of gas pump 14 in such an application, the pressure in both vessels 10 and 17 being lower than the dissociation pressure at the temperature $T_2$ but greater than the dissociation pressure at $T_1$.

Means may be provided to set the temperature $T_1$ of the heat sink 17 at any desired point relative to that $T_2$ of the source 10. For example, a check valve 20 and an on-off valve 21 may be provided between the gas pump 14 and the mixer 16, and a conduit 22 may lead from a point between the valves 20 and 21 to a reservoir 23 via a valve 24. If it is desired to raise the temperature $T_1$ of the sink 17, the gas pump 14 may be used (with the valves 20 and 21 open and the valve 24 closed) to decrease the pressure at the source 10 and to increase the pressure at the mixer 16 and the sink 17, thus increasing the amount of heat transferred per gram of hydride circulated by increasing the degree of reaction in the cycle. Alternatively, the valve 21 may be closed and the valve 24 opened. The gas pump 14 will then pressurize the reservoir 23 to a desired amount through the check valve 20 (which allows flow only in the indicated direction), and the valve 24. When the pressure in the reservoir 23 has reached a desired level, or at a desired time point the valve 21 may be opened rapidly (at any predetermined desired rate) to pass hydrogen under high pressure to the mixer 16 and sink 17, where a high temperature $T_1$ will result because of the sudden application of hydrogen under high pressure will rapidly ingas and will therefore generate a high and controlled quantity of heat which may be adjusted to suit any desired time-temperature relationship at the sink 17 or a time-against-heat flow cycle.

The sink temperature $T_1$ may be made greater or less than that of the source 10 over a wide range by control in this fashion of the rate at which hydrogen reaches, and therefore recombines with, the metal at the sink 17 and/or the degree of (i.e., completeness of) the ingas-outgas cycle, while at the same time the source temperature $T_2$ may remain unaltered. The relation of the rate of heat supply to the rate of heat loss at the sink 17 will of course determine the sink temperature $T_1$, for when heat is supplied faster than it is removed, the temperature rises, and vice versa.

It should be noted that if the transfer of heat is started with lithium hydride at the source 10 and lithium metal in the remainder of the system, then the hydrogen outgassed at the source 10 may be used to first heat and liquefy the lithium metal in the system; after liquefaction, it can be pumped, and the heat transfer cycle may be operated as described. For this reason, it is usually desirable to outgas all system material upon shutting down the cycle, storing the hydrogen thus evolved rather than letting it then recombine with lithium at the sink 17. Upon re-starting, this tored hydrogen gas can be used to liquefy and ingas the lithium.

As an example of operating conditions which may be used with lithium hydride, the temperature $T_1$ of the sink 17 may be 700° C. and the temperature $T_2$ of the source 10 may be 1000° C.; it may further be assumed that the pressure at both source 10 and sink 17 is maintained at one atmosphere. The dissociation pressure for the reaction is given by:

$$\log_{10} P = 11.27 - \frac{9600}{T}$$

where $P$ is the dissociation pressure in millimeters of mercury and $T$ is the temperature in degrees Kelvin, from which it may be calculated that the dissociation pressure at the source 10 is 7.06 atmospheres, a value high enough to insure complete dissociation at the actual operating pressure of one atmosphere. Further, the dissociation pressure at the sink 17 will be 0.033 atmosphere, insuring complete saturation of the lithium by hydrogen at the sink 17.

For further specific illustration, assume that a heat transfer rate of 10,000 kilowatts is wanted. The transfer rate coefficient is then determined (from the specific heats involved and from the heat of transformation given in Table I) to be .62 pounds per kilowatt-hour. Consequently, the transfer rate is 6,200 pounds per hour. In other words, heat energy can be transferred at a rate of 10,000 kilowatts by circulating only 6,200 pounds per hour of the heat transfer medium. This transfer rate is extraordinarily low and therefore extremely desirable. In comparison, the transfer rate for liquid sodium, for the same temperature range and for the same heat quantity transferred, is 215,000 pounds per hour. In other words, the lithium hydride is thirty-five times more efficient than sodium in transferring heat through this temperature range. This means that only about one-thirty-fifth as much power is required to run the pumps when lithium hydride is used as when liquid sodium is used, in order to get the same amount of heat transferred. This is true, not so much because lithium has a somewhat higher specific heat than sodium, but principally because of the very high heat of transformation involved in making and decomposing lithium hydride.

Thus, this first example illustrates the surprising fact that, by employing heat of thermodynamic transformation, the efficacy of heat transfer per unit weight may be multiplied thirty-five times.

Probably more important than the cost of power to run the pumps is the reduction in size of the reservoirs and transfer equipment. This greatly simplifies the thermal insulation problem and reduces the investment in the heat transfer medium.

*Example 2.—Titanium Hydride as Heat Exchange Material*

Titanium hydride, like the majority of hydrides, is preferably pumped in the form of powdered solid at all times, as is the titanium metal. Thus, referring to FIG. 2, titanium hydride powder may be decomposed endothermically at a temperature source 30 at a temperature $T_2$ to yield titanium powder and hydrogen gas with the resultant absorption of a considerable amount of heat from the source. The phases are preferably separated at a separator 31, although that is not always necessary, for transport by separate conduits 32 and 33. The gas may be pumped by means of a compressor 34 while the metallic powder may be pumped by any type of powder pump 35, such as a screw conveyor or a vibratory table. Instead of using the separator 31 to completion, some of the gas may be left in the powder to aid in its transference as a fluidized solid or an excess of hydrogen may even be used. The components, if separated, may be blended at a mixer 36 in the proportions desired and then cooled in a sink 37 at a temperature $T_1$ where they recombine, the hydrogen dissolving in the titanium. A considerable quantity of exothermic heat of solution is released to the sink 37, and the reconstituted titanium hydride is pumped back to the source 30 at the sink temperature through a conduit 38 by means of a pump 39 of the same type as was used to transport the titanium powder.

As a specific instance illustrating this example, assume that $T_1$ is 400° C. and that $T_2$ is 1100° C. At 400° C. and atmospheric pressure, titanium will dissolve 388 cubic centimeters per gram, while at 1100° C. it will retain dissolved only 46 cubic centimeters per gram. Assuming again a heat transfer rate of 10,000 kilowatts, the transfer-rate coefficient may be calculated, using the data of Table III, and will be found to be 2.38 pounds per kilowatt-hour. The transfer rate will then be 23,-800 pounds per hour, which may be contrasted favorably with a transfer rate for liquid sodium of 92,000 pounds per hour between the same temperatures and for the same amount of heat transferred—nearly four times as great.

For certain applications, a system of heat transfer even simpler than that shown in FIG. 2 may be desirable. As shown in FIG. 3, such a system would eliminate the gas pump 34, the mixer 36, and the separator 31; here the hydrogen gas leaving the source 30 is pumped with the powdered metal by the pump 35 through a temperature insulated line 40 to the sink 37. The line 40 is insulated to keep the powder and hydrogen at a temperature near that of source 30. In this system, as illustrated, the pressure at the source 30 and at the sink 37 is the same, and the temperature $T_1$ of the sink 37 is lower than that $T_2$ of the source 30. As heat is removed from the titanium metal and hydrogen gas at the sink 37, the titanium will ingas more and more hydrogen as the sink temperature $T_1$ is decreased, thereby releasing the heat of formation of the hydride as well to the sink 37. The titanium hydride powder is then pumped from the sink 37 to the source 30 via the line 38 by the pump 39 as described above.

*Example 3.—Calcium Hydride as Heat Exchange Material*

The operation with calcium hydride is the same as for Example 2, except only for the fact that powdered calcium hydride is decomposed at the source 30 to yield calcium powder and hydrogen, which are recombined at the sink 37.

To give another specific instance, suppose that $T_1$ is 673° C., that $T_2$ is 1100° C., that the operating pressure at both source 30 and at sink 37 is 800 mm./Hg, and that the heat transfer rate is again 10,000 kilowatts. The dissociation pressures associated with calcium hydride for the above operating temperatures are 1 mm./Hg and 4600 mm./Hg at $T_1$ and $T_2$, respectively so that the dissociation will be essentially complete at the source 30.

The transfer rate coefficient may be calculated, using Table II, to be 1.47 pounds per kilowatt-hour. The transfer rate is then 14,700 pounds per hour. For use of liquid sodium under identical conditions, the transfer rate would be 151,000 pounds per hour—more than ten times as great.

*Example 4.—Silver Oxide as a Heat Exchanger*

Silver oxide may be used in substantially the same manner as titanium hydride except for the working material. Thus, in FIG. 2, solid silver oxide powder may be substituted for titanium hydride and is decomposed at the source 30 to yield silver powder and oxygen gas. The phases are separated at 31 and are transported to the mixer 36 by suitable pumps 34 and 35 and conduits 32 and 33, the gas preferably by a compressor and the powder preferably by a screw conveyor, vibrating table, or other type of apparatus. The components may be blended at the mixer 36 and cooled in the sink 37 to a temperature where they can recombine. The heat of formation is released to the sink 37 and the reconstituted silver oxide is returned to the source 30, preferably by the conduit 38 and a pump 39 like the pump 35 used for the silver powder.

To be specific, assume a sink temperature $T_1$ of 52° C. and a source temperautre $T_2$ of 302° C.; the dissociation pressures for silver oxide are 1 mm./Hg at $T_1$ and 15,238 mm./Hg at $T_2$, so that at an operating pressure of 760 mm./Hg at the source 30 the dissociation of the oxide will be essentially complete, and recombination will be complete at the sink temperature $T_1$ at this pressure. Although it is not essential to make the operating pressure the same for both source and sink, they may be made equal for the purposes of this example.

The heat of reaction is 7,240 calories per mole; so, assuming a heat transfer rate of 10,000 kilowatts, the transfer-rate coefficient may be calculated (see Table IV) and will be found to be 38 pounds per kilowatt hour or a transfer rate of 380,000 pounds per hour. Though somewhat higher than the hydrides, it is still good. It will be noted that this example works in a much lower temperature range, in fact, below the range where sodium is liquid.

*Example 5.—The Use of Palladium Oxide*

This particular example is similar to the use of silver oxide with the exception of the material used. The temperature $T_1$ at the sink 37 in this instance is preferably higher, however, than when silver oxide is used. It may be around 587° C., while the temperature $T_2$ at the source 30 may be 927° C. Again, a heat transfer rate of 10,000 kilowatts is assumed. The heat of reaction for this material is 171.5 gram-calories per gram of silver oxide, the dissociation pressure at $T_1$ is 1 mm./Hg and at $T_2$ is 70,000 mm./Hg. Again, an operating pressure for both source 30 and sink 37 may be chosen as one atmosphere or 760 mm./Hg, for example, as a pressure which will allow complete dissociation of the oxide at the source 30 and will allow recombination at the sink 37. The transfer-rate coefficient is calculated to be 9.4 pounds per kilowatt-hour, giving a transfer rate for 10,000 kilowatts of 94,000 pounds per hour. For liquid sodium the comparable rate would be 190,000 pounds per hour.

*Example 6.—Heat Transfer With Control by Pressure Variation*

Rapid isothermal heat transfer becomes possible with the system of the present invention. For example, consider a situation where it is desired to maintain a reaction vessel at a constant temperature. In the prior art this was usually achieved by providing separate heating and cooling devices and using one or the other of these in response to a temperature sensor.

However, equivalent results may be obtained more conveniently and more economically by the single system illustrated diagrammatically in FIG. 4. Here a reaction vessel 50 is provided with an element 51 containing a suitable hydride-forming metal which, for purposes of this example, may be sodium. There are a temperature sensor 52 and a resistance sensor 53 at the sodium element 51, the sensors 52 and 53 being connected respectively to control means 54 and 55 by some suitable arrangement. The element 51 is connected to a reservoir 56 of hydrogen gas by two links, one of them a valved line 57 containing a valve 58 and a pressure-reducing regulator 59 and the other a valved line 60 containing a valve 61 and a gas compressor 62.

Suppose that the sodium has been partially converted to sodium hydride. Also suppose that it is desired to maintain the reaction vessel 50 at a temperature of 421° C. By calculation from the dissociation pressure against the temperature relation, it will be found that the control element 51 will be in equilibrium at this temperature if the hydrogen pressure thereover is maintained at one atmosphere pressure (760 mm. mercury). If it is desired to add or remove heat from the element 51, it is only necessary to change the pressure of gas over the solid material 51 by means of the pressure regulator 59 or the compressor 62. If the temperature of the reaction vessel 50 becomes lower than desired, the greater heat thus required in element 51 is produced there by causing hydrogen gas to flow into the element from the hydrogen reservoir 56 through the pressure regulator 59. Conversely, if the temperature of the reaction vessel 50 becomes higher than desired, the surplus heat in the element 51 is removed by removing hydrogen gas therefrom by means of the compressor 62. Any change in temperature at the reaction vessel 50 can be transmitted by the temperature sensor 52 to its control 54, where a signal is generated in a well-known manner to affect the pressure regulator 59 or the compressor 62 in the appropriate manner.

Since the element 51 cannot provide heat for or remove heat from the reaction vessel 50 in indefinite amounts, a conventional heat exchanger 63 may be installed at the element 51 to transfer heat to or from a heat reservoir 64 as needed.

It has been observed experimentally that the electrical resistance of a hydride, such as the sodium hydride in this example, is directly proportional to the amount of hydrogen adsorbed in the hydride: i.e., resistance is proportional to degree of ingassing of the hydride. If means are provided to measure this resistance at the element 51, then an increase in heat demand by the reaction vessel 50 will cause an increase in the degree of ingassing of the element 51 and a consequent increase in resistance thereof, as measured by the sensor 53, which might typically take the form of a Wheatstone bridge, providing a signal to its control 55. A decrease in heat demand by the reaction vessel 50 would cause a decrease in the degree of ingassing of the element 51 and hence a decrease in the resistance measured by the sensor 53. The control 55, responding to a decrease of hydride resistance as sensed by the sensor 53, causes heat to be removed from the element 51 through the heat exchanger 63, delivering the removed heat to the heat reservoir 64. An increase of hydride resistance as sensed by the sensor 53 causes heat to flow from the reservoir 64 through the heat exchanger 63 to the element 51, again under control of the control means 55. Control of heat flow to or from the reservoir 64 is effected in a manner that maintains the average resistance of the hydride as sensed by the sensor 53 to be that corresponding to the desired equilibrium or mean value of degree of hydride ingassing. Thus, removal of hydrogen from or its addition to the element 51 is used to quickly and accurately control relatively small temperature fluctuations of reaction vessel 50, the heat reservoir 64 serving to keep such temperature variations within the range of control by the element 51.

The dissociation pressure for this reaction, $$2\ Na + H_2 \rightarrow NaH$$

is given by the equation $$\log_{10} P = 11.66 - \frac{6100}{T}$$

where P is pressure in millimeters of mercury and T is temperature in degrees Kelvin.

*Example 7.—Heat Transfer (Source Colder Than Sink)*

Referring to FIG. 1, it should be noted that the pressure variation may be used to transfer heat from a source 10 which is actually colder than the sink 17; i.e., maintenance of proper source and sink pressure will allow the operation of the described system as a refrigerator. In particular, assume that sodium and sodium hydride are being used in the system of FIG. 1 and that the source 10 is initially at a temperature of 500° K. and the sink 17 at a temperature of 700° K. The dissociation pressure associated with these temperatures are 3 millimeters of mercury and 890 millimeters of mercury, respectively. Further assume that the pressure at the source 10 is maintained at some value less than 3 mm./Hg and that at the sink 17 is maintained at some value greater than 890 mm./Hg. Under these conditions hydrogen would be released at the source 10, thereby cooling it, and would be absorbed at the sink 17, thereby heating it.

*Example 8.—A Heat Exchanger Using Relative Motion Between an Envelope System and the Heat Source and Sink*

This example involves a metal hydride but also utilizes the specific heats of the gas and of the metal as well as the total heat of formation of the compound. The purpose of this system is to avoid the problem of pumping metal and hydride, by actually moving the whole heat-transfer system in such a manner that the roles of symmetric end elements are reversed cyclically. The only component which is required to flow in this system is the hydrogen gas.

The system is shown diagrammatically in FIG. 5, where the heat exchanger consists of two vessels 70 and 71 connected by a gas line 72 and mounted pivotally at 73. By way of example, it will be assumed that the vessels 70 and 71 are charged with partially hydrided sodium metal. In FIG. 5 the transfer system is designed to rotate about the center 73 so that the end elements 70 and 71 sweep through two regions 74 and 75 which are opposed 180° from each other, one of which may be regarded as the heat source, at temperature $T_2$, while the other is a heat sink at temperature $T_1$.

When the element 70 is immersed in the source 74, the element 71 will be immersed in the sink 75. The heat received in the element 70 causes dissociation of the sodium hydride into sodium metal and hydrogen gas. The metal is retained in the element 70, while the gas flows through the transfer line 72 to the element 71, where it combines with free sodium metal to form sodium hydride. This results in the production of heat associated both with the formation of the compound and the specific heat of the hydrogen gas. When the element 71 is sufficiently filled with sodium hydride so that most of its originally free sodium has been combined, the system may be rotated about the center 73 to place the element 71 at the source 74 and the element 70 at the sink 75. The same reaction will take place at the source 74 and at the sink 75, but the sodium hydride, which is now in the element 71 and is now at the source 74, will be decomposed, internally cooling the element 71, and the hydrogen will flow to the element 70 and recombine there, again transferring heat from the source 74 (internally cooling the element being heated) to the sink 75 (internally heating the element being cooled). When the cycle has been completed, or at any earlier time, another rotation is given and the materials are restored to their original position. The cycle can be smooth and even continuous if desired. It is not, of course, necessary to carry each step to completion.

Obviously, this transfer device, consisting of two elements may, if desired, be replaced by a circular system containing a continuous distribution of sodium hydride. It should also be noted that source 74 and sink 75 can rotate while the elements 70 and 71 remain fixed; alternatively, the elements 70 and 71 can, in general, partake of any type of motion such as translatory, rotational, reciprocating, oscillating, etc. The only requirement for heat transfer is that there be relative motion between the elements 70 and 71 and the source and sink 74 and 75 respectively to accomplish cyclic alternate heating and cooling of alternate elements.

A specific example of the general system shown in FIG. 5 and described above is that of a getter-cooled turbine rotor. It will be assumed that this rotor is comprised of an even number of hollow blades, one of each pair being filled initially with hydride and the other of each pair being filled with metal (sodium hydride and sodium, for example) and connected to the rotor hub in such a manner that the blades may freely pass outgassed hydrogen between one another: in FIG. 5 the element 70 might represent one hollow blade of a pair and the element 71 the other blade of the pair, rotating (with the other blade pairs, which are not shown for reasons of clarity) about the hub 73 and connected by a gas transfer line 72. In the operation of a turbine most of the heat which the material comprising the rotor is required to withstand is concentrated in a relatively small region (as at a nozzle in a steam or gas turbine), which region may be designated the heat source 74; at the same time the region opposite source 74 is a relatively cool one and is designated the heat sink 75.

In operation, it is very desirable to equalize the temperature of the various rotor blades as well as possible since their material must be able to stand the peak temperature encountered, even if that temperature is experienced by a given blade only during a fraction of a revolution. This means of cooling the blades achieves that result in the following manner; assume that blade 70 contains ingassed hydride and has just entered the high temperature source region 74, while its companion blade 71, containing outgassed metal, has entered the cooler region 75. Heat transferred from the source 74 to the blade 70 will cause the hydride contained therein to outgas hydrogen, the heat transferred from the source 74 to the blade 70 being absorbed in this reaction, thus cooling the blade 70. The outgassed hydrogen is allowed to flow through the line 72 to the metal contained within the blade 71; the consequent ingassing of the metal there will liberate the transferred heat, the heat being dissipated at the sink 75.

After a half cycle, the blades 70 and 71 will have changed places, the blade 71 then being exposed to the heat source 74 and the blade 70 being at the sink 75. Since the blade 71 has contained hydride due to its ingassing as described above, it can now transfer heat to the blade 70 at the sink via hydrogen outgassed from its hydride and flowing through the line 72. When the blade 70 again is in the heat source region 74, the cycle has been completed. Each other blade on the rotor experiences the same cycle of outgassing and ingassing in turn, depending upon the temperature distribution around the rotor.

It should be pointed out that the process of heat distribution described here can take place under any conditions around the rotor, so long as there exist temperature differentials among blades; for while a discrete gas transfer line 72 has been shown to connect a single blade pair 70 and 71 in FIG. 5, all of the rotor blades would normally be connected together by lines 72 so that hydrogen may seek those elements which are at lowest vapor pressure which are those most nearly outgassed and coolest. The heat source 74 may thus be present at several positions (such as would be the case in the normal turbine, which contains more than one nozzle and hence more than one source 74), either fixed or varying, and the rotor may revolve in either direction, without affecting the transfer of heat herein described. If half the blades are initially filled with hydride and the other half initially filled with metal, the proper relation of ingassed material at a source 74 and outgassed material at a sink 75 will be established after one revolution of the rotor.

*Example 9.—Artificial Earth Satellite. (FIG. 6)*

Consider an artificial earth satellite 80 in its orbit. In any instance, one-half of the sphere 80 may receive radiation from the sun 81, but the other side will not. The temperature of the side receiving the radiation will become much higher than the other, thereby creating temperature gradients which may be adverse to the effective operation of the internal circuitry. This imbalance may be reduced by rotation of the satellite 80. However, the temperature equalization may be greatly improved by an application of Example 8. If a satellite 80 is surrounded by a spherical shell containing a suitable metal hydride, the hydride on the side receiving the radiation will decompose and cool that side, while hydrogen will flow to the cold side and heat it as a result of its recombination with the metal. This hydrogen flow may be extremely rapid, and it will therefore be possible to achieve any temperature equalization rate at a substantially lower rotation rate.

As shown in FIG. 6, if the hydrogen is restricted to flow through a turbine 82, it is possible to convert this solar energy into electric power, which can be used for operation of the internal circuitry, thus making the satellite 80 independent of storage battery life. Here are shown two thin hemispherical layers 83 and 84 of hydride laminated between the inner and outer shells 85 and 86 of the satellite 80. The two hemispherical layers 83 and 84 are shown separated by gas-tight baffles 87 and connected to each other by a gas transfer line 88 through the turbine 82.

Solar energy impinging on the outer shell 86 causes outgassing of the hydride adjacent thereto. Due to the presence of the gas-tight baffles 87, this gas is constrained to move under pressure through the turbine 82 via the transfer line 88. The pre-set rotation of the satellite 80 in its orbit causes the hydride layers 83 and 84 to alternately outgas through the turbine 82. The turbine 82 may be either a two-way device or separate turbines controlled by suitable valving, and may be used to turn an electric generator 90.

Since radiant energy, and only secondarily that due to air friction, is primarily being transferred by the outgassed hydrogen, it would also be feasible to construct the spherical shell 86 of the satellite of some material which is transparent to radiant energy, such as fuzed quartz or sapphire, allowing the impinging radiant energy to be absorbed directly by the hydride layers 83 and 84. The use of sapphire would possess the advantage that the shell 80 could be brazed, and the dielectric properties of both quartz and sapphire may be exploited by placing radio transmitting and/or receiving antennae within the body of the satellite 80, eliminating the necessity of any external projections; frictional effects of the air would thus be reduced to a minimum. The antennae may be located within the sections 83 and 84 by using insulation between the antennae and the hydride and suitable sealed terminals through the inner shell 85. Quartz and sapphire also possess the advantage of permitting a minimum amount of hydrogen leakage.

For many purposes the volume of hydride or other heat exchange material moved is an important consideration in the design of the equipment. In this connection it should be noted that the specific instance given in connection with Example 1, where lithium hydride was compared with liquid sodium on a mass basis, would, if calculated on a volume basis, show that the sodium required to get the same effect in this instance would occupy a volume 29.3 times as large per unit time as that occupied by the lithium hydride. The titanium hydride referred to in Example 2 would, on a volume basis, be 15.7 times as efficient as the liquid sodium for the operating conditions referred to in that example. The calcium hydride under the conditions of Example 3 would occupy only $\frac{1}{18}$ the volume per unit time of the liquid sodium. Similarly, liquid sodium would require 17.3 times as much volume per unit of time as the palladium oxide referred to in Example 5.

While cost factors are often determinative, sometimes the cost of materials changes under new conditions and for that reason it may be noted here that praseodymium, lanthanum and cerium are capable of very efficient use among the group B materials, should they become plentiful enough.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

For example, although all of the examples given above use only single-metal hydrides and oxides, it should be noted that mixtures or alloys of suitable metals may be used. Alloying techniques offer a number of advantages. For one thing, the quantity of hydrogen that may be contained in an alloy may be larger than the quantity contained by equivalent amounts of the separate metals. For another, the transition temperatures of the pure metals may be modified by the addition of small quantities of alloying metals. For yet another, some alloys may be more convenient to handle than the constituent metals. In particular, lithium might be handled as a solid at high temperatures by alloying it with more refractory alkali metals.

What is claimed is:

1. A waterless method for transferring heat from a heat source to a heat sink, comprising using the heat at said source to heat an endothermically, dissociable compound of a metal and a gas at said source to endothermically break up said compound into non-gaseous metal and the gas, separating said gas from said non-gaseous metal, moving them separately to said sink, recombining them exothermically at said sink to give heat to said sink in amounts considerably greater than that transferred by specific heat, moving said compound to said source, and continuously repeating said steps in cycle.

2. A system for transferring heat from a heat source to a heat sink, comprising a metal hydride subject to endothermic dissociation at said source and exothermic association at said sink; means for separating hydrogen and said metal at said source; means for moving them separately to said sink; and means for moving the hydride from said sink to said source.

3. A method for transferring heat from a heat source to a heat sink, comprising heating an endothermically dissociable metallic hydride at said source to endothermically break up said hydride into a metal and hydrogen gas, separating said gas and metal, moving them to said sink, recombining them exothermically at said sink to give heat to said sink in amounts considerably greater than that transferred by specific heat, moving said hydride to said source, and continuously repeating said steps in cycle.

4. The method of claim 3 wherein said hydride is a stoichiometric compound of hydrogen with a metal chosen from the group consisting of the alkali and alkaline earth metals.

5. The method of claim 3 wherein said metal is chosen from the group consisting of lithium, sodium, potassium, rubidium, cesium, calcium, strontium, barium, francium, and radium.

6. The method of claim 3 wherein said metal is chosen from the group consisting of scandium, titanium, vanadium, ytterbium, zirconium, niobium, the rare earth metals, hafnium, tantalum, and the actinide metals, and, at temperatures above about 300° C., palladium.

7. The method of claim 3 wherein said metal is chosen from the group consisting of lithium, sodium, potassium, rubidium, cesium, calcium, strontium, barium, francium, radium, scandium, titanium, vanadium, ytterbium, zirconium, niobium, the rare earth metals, hafnium, tantalum, the actinide metals, and at temperatures above about 300° C., palladium.

8. The method of claim 7, wherein said metal is an alloy of members of the stated group.

9. A method for transferring heat from a heat source to a heat sink, comprising heating an oxide of metals chosen from the group consisting of mercury, silver, palladium and their alloys, at said source, to endothermically break up said oxide into a metal and oxygen, separating said oxygen and metal, moving them to said sink, recombining them exothermically at said sink to give heat to said sink in amounts considerably greater than that transferred by specific heat, moving said oxide to said source, and continuously repeating said steps in cycle.

10. A method for transferring heat from a heat source to a heat sink, comprising heating an endothermically dissociable metallic hydride at said source to endothermically break up said hydride into a metal and hydrogen gas, moving said gas to said sink, and combining it exothermically with metal at said sink to give heat to said sink in amounts considerably greater than that transferred by the specific heat of hydrogen.

11. The method of claim 10 wherein when the metal hydride at said source has been de-hydrogenated to metal and said metal at said sink has been hydrided, the hydrided metal is moved to said source while the de-hydrogenated metal is moved to said sink.

12. A heat transfer system, wherein hydrogen and a suitable metal are initially reacted exothermically to form a hydride of said metal and to liquefy said hydride, moving said liquid hydride to a heat source, endothermically dissociating them there into liquid metal and gaseous hydrogen, moving them to a heat sink to recombine exothermically, and thereafter circulating the hydride-metal-to-gas as a heat transfer medium over and over through the cycle.

13. A system for transferring heat from a heat source to a heat sink, comprising a metal and a gas subject to endothermic dissociation at said source and exothermic association at said sink; means for moving the associated product from said sink to said source, and means for moving the dissociated product from said source to said sink.

14. The method of claim 3 wherein said metal is chosen from the group consisting of lithium, sodium, and potassium and mixtures thereof.

15. The method of claim 3 wherein said metal is chosen from the group consisting of calcium, strontium, and barium and mixtures thereof.

16. The method of claim 3 wherein said metal is chosen from the group consisting of titanium, zirconium, and palladium, and mixtures thereof.

17. A method for transferring heat from a heat source to a heat sink comprising heating at said source hydrogen and a metal which adsorbs hydrogen endothermically to form a metallic hydride, moving said hydride to said sink, and breaking up said hydride at said sink in an exothermic reaction.

18. The method of claim 17 wherein said metal is chosen from the group consisting of copper, silver, molybdenum, tungsten, iron, cobalt, nickel, aluminum, platinum, manganese, technetium, rhenium, osmium, iridium, ruthenium, and rhodium, and, at temperatures greater than about 300° C., chromium.

References Cited in the file of this patent
UNITED STATES PATENTS

| | | |
|---|---|---|
| 1,738,342 | Zellhoefer | Dec. 3, 1929 |
| 1,748,518 | Midgley | Feb. 25, 1930 |
| 2,044,750 | Bryant | June 16, 1936 |
| 2,313,087 | Parr et al. | Mar. 9, 1943 |
| 2,610,109 | Adams et al. | Sept. 9, 1952 |
| 2,703,275 | Elliott et al. | Mar. 1, 1955 |
| 2,746,725 | Reed | May 22, 1956 |
| 2,819,881 | Sampietro | Jan. 14, 1958 |

OTHER REFERENCES

"Dissociation-Cooling," (McKisson), published by the Atomic Energy Commission, Document LRL–86 (March 1954). (Pages 5, 6, 17, 18 and 19 relied on.)

"A Survey Report on Lithium Hydride" (Gibb, Jr. et al.), published by the Atomic Energy Commission, Document NYO–3957 (May 2, 1954), pages 1 and 22 relied on.

"Compounds of Hydrogen with Metals and Metalluds," reprint from Journal of Electrochemical Society, vol. 93. No. 5, May 1948.